United States Patent Office
3,159,178
Patented Dec. 1, 1964

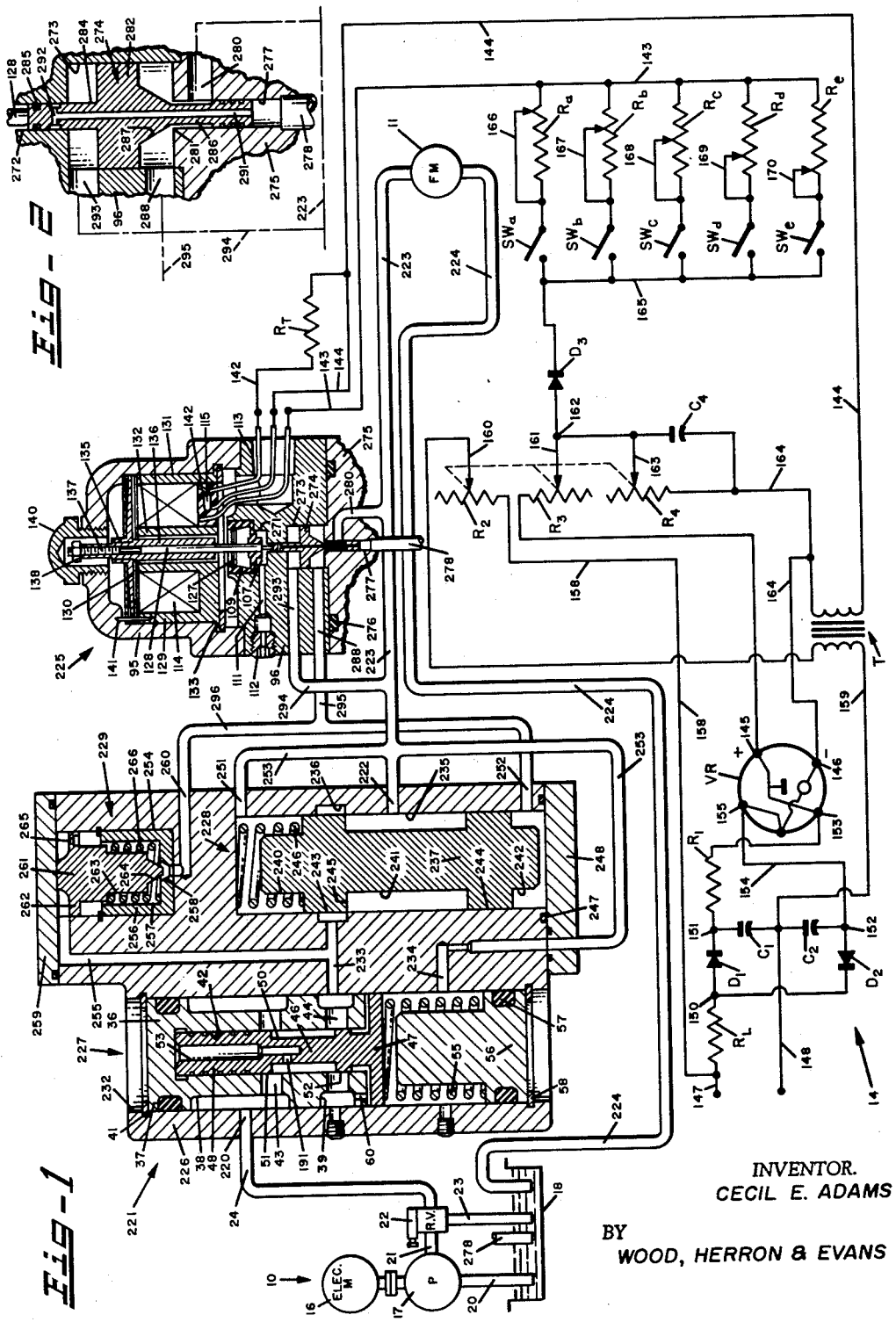

3,159,178
ELECTROHYDRAULIC FLOW CONTROL APPARATUS
Cecil E. Adams, Columbus, Ohio, assignor to American Brake Shoe Company, New York, N.Y., a corporation of Delaware
Filed Apr. 4, 1961, Ser. No. 100,753
17 Claims. (Cl. 137—501)

This invention relates to apparatus for adjustably controlling the rate of flow of hydraulic fluid under pressure. More particularly, the invention relates to electrically controllable apparatus for adjustably regulating the rate of flow of hydraulic fluid under variable pressure conditions.

Devices for regulating the flow of hydraulic fluid have utility for a wide variety of purposes. For example, such devices are commonly employed to permit only a fixed number of gallons of fluid per minute to flow to a hydraulic motor, thereby maintaining the speed of rotation of the motor at a fixed number of revolutions per minute. As another example, it is often desirable to admit fluid at a constant flow rate to the cylinder of a hydraulic ram so that the ram will advance at constant speed regardless of variations it may encounter in the resistance presented to it by a work piece.

While there have heretofore been available flow control devices which permit adjustment or change in the volume of flow which they permit to pass in unit time, it has usually been necessary to make such adjustments manually, as by loosening a lock nut, changing the relative position of an orifice-forming element, and then retightening the nut. For obvious reasons, it has been difficult to make such adjustments remotely. Moreover, it has been difficult quickly to set previous flow control devices to maintain the flow rate at any preselected numerical value. For example, if it is desired, say, to maintain a flow rate of 4 gallons per minute to a hydraulic motor, the flow control apparatus must usually be set so that the flow rate will approximate the desired value. With the apparatus thus set, the actual flow must then be measured and the setting of the apparatus "inched" to a better approximation of the desired rate. That this type of adjustment has been difficult to effect remotely can also be appreciated.

In contrast to such past devices, this invention is directed to flow control apparatus which is electrically controllable and by which the flow rate may be set at any desired value quickly, remotely, and accurately.

In accordance with this invention, the rate of flow of fluid under pressure to a work load may be set at any desired value within a preselected operating range simply by regulating the current supplied to an electromechanical control element. This flow rate will thereafter be maintained regardless of variations or fluctuations either in the pressure of the fluid supplied to the flow control apparatus or in the resistance encountered at the work load.

Broadly speaking, the flow control apparatus of this invention includes structure forming a main orifice, structure forming a pilot or trimmer orifice, fluid passageways through which fluid under pressure is supplied to the respective inlets of the main and pilot orifice structures, and means whereby the pilot or trimmer orifice structure is rendered effective to control the total flow of fluid through the flow control apparatus to an output or load conduit.

More specifically, the invention comprises a main flow orifice assembly, a pressure regulator assembly, and a trimmer or pilot valve. The main flow orifice assembly includes a body having an inlet port and an outlet port and structure forming an adjustable or variable orifice between those ports the area of which can be varied. The pressure regulator assembly maintains a constant pressure differential or pressure drop between the pressure of fluid at the inlet and outlet ports of the main flow orifice assembly. The trimmer or pilot valve includes a body having a bore, an inlet port and an outlet port, a movable valve member for establishing a pressure drop between the inlet and outlet ports, and an electromechanical transducer for actuating the valve member which delivers a substantially constant force for a given electrical input thereto in a direction tending to close the pilot valve. A fluid passageway communicates between the inlet port of the main flow orifice assembly and the inlet port of the trimmer or pilot valve, and other means interconnect the pilot valve with the main flow orifice assembly in such manner that the pilot valve is rendered effective to control the total flow delivered by the flow control apparatus to an output or load conduit.

These and other aspects of the invention may best be described by reference to the accompanying drawings, in which:

FIGURE 1 is a schematic diagram of a hydraulic system embodying the principles of a preferred aspect of the invention, for supplying fluid at a controllable rate of flow to a fluid motor, including a cross-sectional view of an electrohydraulically controlled pilot valve, an electronic circuit for controlling the pilot valve, and a sectional view of a flow metering assembly responsive to the pilot valve; and FIGURE 2 is an enlarged sectional view of the valve forming members of the pilot valve shown in FIGURE 1.

The operation of the system shown in FIGURE 1 is controlled by an electrical input supplied to an electrohydraulically operated pilot valve. The pilot valve can be set, by closing an appropriate switch, to provide any of a number of preselected operating ranges, over each of which the rate of flow can be either gradually varied or maintained at any value in the range simply by adjusting a variable resistor.

This system includes a source 10 of fluid under pressure, a work load 11 which for purposes of illustration is taken to be a fluid motor, a main flow metering assembly 221 connected between the source 10 of fluid under pressure and the work load 11 for adjusting the flow to the load, an electrically operated pilot valve 225 which governs the flow rate maintained by the flow metering assembly 221, and an electric circuit 14 for operating and controlling the pilot valve 225.

The source of fluid pressure 10 is conventional, and may comprise an electric motor 16 driving a hydraulic pump 17. The pump receives hydraulic fluid from a tank 18 through a conduit 20 and discharges fluid under pressure into a conduit 21. This conduit 21 is connected to tank 18 through a relief valve 22 and a conduit 23. These elements 16–23 will be understood to represent a conventional source of fluid under pressure by which the work load 11 is operated.

The system shown is of the two-port, meter-in type in which the flow control assembly is connected in series with the work load and meters to it that flow which is desired, the remainder of the output of the pump being diverted to tank through the relief valve 22. In this system the pump 17 supplies at all times the pressure at which the relief valve 22 is set.

A pressure conduit 24 is connected from relief valve 22 to the inlet port 220 of the main flow metering assembly 221. The load port of the main flow metering assembly 221 is designated at 222 and is connected through a conduit 223 to the fluid motor 11 or other work load. A conduit 224 connects the low pressure side of the fluid motor 11 to tank 18. The pilot valve 225 regulates the flow passed by the main flow metering assembly 221, by acting on a pilot flow of very low volume which is added to the flow through the main flow metering assembly 221, and thus comprises a small secondary orifice.

The Main Flow Metering Assembly 221

The main flow metering assembly 221 is contained within a block 226 and includes pressure compensating means 227, a variable orifice mechanism 228 and pilot flow regulator means 229. The pressure compensator mechanism 227 is contained within a bore 232 in block 226, and functions to maintain a constant pressure differential across the variable orifice mechanism 228. The variable orifice 228 is also housed in block 226, and directly controls or meters the rate of flow of fluid to the load port 222 of the flow metering assembly.

The elements contained within bore 232 include a cylindrical element or cylinder 36 having spaced circumferential grooves 37, 38, and 39. This element 36 is inserted into one of the open ends of bore 232, retained therein by a snap ring 41, and sealed to the bore by an O-ring contained within a groove 37 which is adjacent snap ring 41. Cylinder 36 has an axial bore 42 which extends upwardly toward but not through its upper end and which is connected to grooves 38 and 39 by passages or ports 43 and 44 respectively.

A compound piston element 46 is also contained within bore 232 and includes a piston head 47 of diameter equal to that of the bore and a smaller diameter shank 48 which extends into and reciprocates within bore 42 of cylinder 36. This shank 48 is provided within a circumferential groove 50 flanked by a pair of lands 51 and 52. Land 52 functions merely as a guide or bearing for the compound piston 46 and never closes port 44. Land 51 cooperates with port 43 to form a valve for controlling the flow of fluid through port 43 in accordance with the vertical position of the sharp lower peripheral edge of the land 51. The compound piston 46 is provided with a vertical bore 53 which extends downwardly from its upper end and communicates through a lateral drilling 191 to groove 50. Port 220 communicates with groove 38 through block 226.

The piston 46 is urged upwardly to the position shown in FIGURE 1 by a spring 55 which is compressed between the piston head 47 and a block 56. Spring 55 is a low rate spring; that is, the force it supplies when compressed is relatively independent of the degree of compression it has undergone. The block 56 is inserted into the other end of bore 232, sealed by an O-ring 57, and is retained in the bore by a snap ring 58. The block 56 forms an abutment which limits the downward movement of the piston 46 in bore 232. A bore 234 is formed in block 226 leading to the chamber in bore 232 below piston head 47. The chamber formed in the bore between the upper face of the piston head 47 and the adjacent end of cylindrical element 36 is connected with groove 39 by a passage 60 formed in the cylindrical element and extending from port 44 to the bottom of element 36.

The variable orifice mechanism 228 is contained in a bore 235 in block 226 which is parallel to bore 232. This bore 235 is provided with a circumferential groove 236 which communicates with groove 39 through a bore 233. Inside bore 235 a flow metering spool 237 is slidably received. Spool 237 comprises a cylinder provided with three circumferential grooves 240, 241, and 242 between which are lands 243 and 244. Both lands 243 and 244 serve as guides for spool 237 in bore 235, and the sharp lower edge 245 of uper land 243 acts a valve element to regulate flow through groove 236. A spring 246 positioned above upper land 243 between groove 240 and the end of bore 235 urges spool 237 downwardly in bore 235, as shown in FIGURE 1. The lower end of bore 235 is sealed by an O-ring 247 received in a groove in block 226 around the lower end of bore 235 and an end plate 248 connected to block 226 by suitable means not shown. A port 251 is formed in block 226 which opens into the chamber above the upper end of spool 237, and a port 252 is formed in block 226 which opens into the chamber in bore 235 beneath the lower end of spool 237. A conduit 253 connects port 251 to bore 234 and conduit 223.

The function of the pilot flow regulator 229 is to bleed-off a pilot flow of low volume from bore 233 which is then acted upon by the pilot valve 225 in a manner effective to control the main flow to the work load. The particular regulator 229 shown in FIGURE 1 is a preferred means for metering a small but constant flow to the pilot valve 225.

Pilot flow regulator 229 is contained in a bore 254 in block 226. A bore 255 communicates between bore 233 and the upper end of bore 254. A cup-shaped sleeve 256 having a cylindrical bore 257 extending axially toward its lower end is tightly received in bore 254. At the lower end of sleeve 256 a conical valve seat 258 is formed which communicates with a port 260 formed in block 226. A plate 259 closes the upper end of bore 257. A valve element 261 is slidably received in bore 257 of sleeve 256, and comprises a cylindrical piston having a head 262 of diameter equal to that of bore 257, a shank 263 of smaller diameter, and a conical tip 264 which forms a valve with seat 258 in sleeve 256. A small orifice 265 is provided in piston head 262 which opens at its upper end into the chamber above piston head 262 and at its lower end into the chamber between shank 263 and the inside wall of sleeve 256. A spring 266 urges valve element 261 upwardly in bore 257.

Fluid under pressure from bore 255 exerts a downward force on the upper surface of piston head 262. This fluid flows through orifice 265 into the chamber in sleeve 256 below head 262 and, together with spring 266, exerts an upward force on valve element 261. The net force acting on this valve element 261 is that supplied by spring 266, the hydraulic forces on its opposite surfaces being substantially equal. This force causes element 261 to move upwardly in bore 257, opening valve 258, 264, and permitting a metered constant flow through it to pilot valve 225.

This metering function is accomplished at the valve 258, 264 which acts as an orifice, the effective size of which is automatically regulated by the pressure drop across the orifice 265 in the piston head 262 and the spring 266.

It will be seen that, theoretically, a single small orifice would function to limit the pilot flow to bore 260 to a very small quantity, but such a small orifice would be subject to contraction or complete closing by impurities in the fluid passing through it which, of course, would impair the operation of the system or even render it completely inoperative. The pilot flow regulator 229 is not subject to clogging by dirt in the fluid flowing through it since the position of the tip 264 with respect to the seat 258 is automatically regulated by the pressure drop across the orifice 265 and the spring 266. Should foreign matter or dirt tend to accumulated between the seat 258 and tip 264 the valve element 261 automatically assumes a new position to restablish the correct pilot flow through the orifice 258, 264.

The Pilot Valve 225

As previously noted, the setting of the flow metering apparatus 221 is controlled by an electrohydraulic pilot valve 225. In FIGURE 1, pilot valve 225 is shown separately from the flow metering apparatus 221 for clarity, but in practice it is preferred to mount the pilot valve physically adjacent or integral with the flow metering apparatus.

The pilot valve 225 is housed in a body comprised of two elements 95 and 96 which are connected by screws not shown. The lower body element 96 is provided with a flat bottom surface for mounting atop a block 275 which, as explained, can in practice be contiguous with the flow metering apparatus 221. An O-ring 276 in a groove in the lower surface of body element 96 forms a seal with the top surface of block 275.

The lower body element 96 is provided with an upper axial bore 271, an intermediate bore 272 of small diameter, and a large diameter lower bore 273, in which a valve element 274 is contained. Block 275 presents a bore 277 which is concentric with bores 271, 272, and 273 and which is connected through a conduit 278 to tank 18. An outlet passageway 280 enters bore 277 near a sharp corner 281 where bore 277 meets the surface of block 275, and is connected to conduit 223.

The valve element 274 is shown in detail in FIGURE 2. This element 274 comprises a head 282 of diameter nearly equal to that of bore 273. An axial shank 284 extending upwardly from head 282 is slidably received in bore 272 and is sealed thereto by an O-ring 285 contained in a groove in shank 284. An operating shaft 128, extending downwardly through a flexible boot 109 which closes a chamber 107 in bore 271, bears upon the upper end of shank 284. A shank 286 extends downwardly into bore 277 in block 275 from a conical portion 287. Together with the sharp corner 281 at outlet port 280, conical portion 287 of valve element 274 forms a valve by which a pressure differential between inlet bore 288 and outlet bore 280 is established. A groove is formed around shank 286 below conical portion 287 to permit flow readily to pass to bore 280 when the valve is open. A small diameter bore 291 extends axially in valve element 274 from the lower end thereof upwardly to a small lateral passageway 292 in shank 284, to return fluid escaping upwardly along shank 284 to tank 18 through conduits 278. It should be mentioned that the areas of the tip of shank 284 and the bottom of shank 286 are substantially equal, and that both of these areas are exposed to substantially the same pressures, one to atmosphere and the other to tank, and therefore there will be no unwanted forces opposing the downward force of plunger 128. A bore 293 and conduit 294 connect the chamber in bore 273 above piston head 282 with conduit 223, and inlet bore 288 communicates from the chamber below piston head 282 to conduit 295, which in turn is connected to a conduit 296 communicating between ports 260 and 252 of block 226. The previously mentioned boot 109 is inserted into bore 271 against a shoulder therein. An expansible type coil spring 127 retains boot 109 in bore 271, and the boot 109 is provided with a thickened elastic central portion having a bore which surrounds and sealingly grips the shaft 128. This shaft is of brass and is nonmagnetic. Chamber 107 is joined below boot 109 by a horizontally extending bore 111 which is partially closed by a breather or vent plug 112. Body element 96 is also provided with a passageway 113 through which pass insulated wires connected to the electric coil 114 and thermistor 115 of an electromechanical transducer assembly contained in body member 95.

Body element 95 is cast of a non-magnetic material such as aluminum, and is bored to receive a core 129 in which the coil 114 and thermistor 115 of the transducer assembly are housed. Core 129 and an armature disk 130 which is positioned above it are preferably formed of material which has high magnetic permeability and low hysteresis such as an ingot iron. Core 129 is a cup-shaped cylinder having side walls 131 which provide magnetic poles and a hollow center post 132 which also provides magnetic poles. Coil 114 is embedded in an insulating plastic material in the core 129, while thermistor 115 is embedded in the same plastic material in a notch-like opening formed in the bottom of the core 129. The outside diameter of the core 129 is such as to establish a close slidable fit with the bore in body element 95, and the core is provided with a peripheral flange 133 which abuts a shoulder on body element 95. Flange 133 of core 129 is clamped to body element 95 by a snap ring in a groove in body element 95.

The electromagnet above described including core 129 and coil 114 operates an armature including disk 130. This disk has a hollow hub 135 into which a tube 136 of non-magnetic material is pressed. The armature disk 130 extends over the outside magnetic poles formed by the side walls 131, and tube 136 extends freely through the center post or poles 132 of core 129. The armature disk 130 does not contact body element 95. Shaft 128 fits snugly but axially slidably within tube 136 of the armature and its upper end is abutted by an adjusting screw 137 which is threaded into the upper end of tube 136 and which is provided with a locking nut 138. An externally threaded hollow plug 140 covering screw 137 and nut 138 is threaded into body member 95. Rotation of core 129 and armature disk 130 with respect to each other and body element 95 is prevented by a non-magnetic pin 141 which extends through disk 130 into aligned openings in body element 95 and core 129. The opening in the armature disk 130 through which pin 141 extends is of a diameter larger than that of pin 141 so that should disk 130 contact the pin during operation of the device there will be substantially no frictional resistance between them. Pin 141 extends through disk 130 to hold it against rotation during adjustment of screw 137 and nut 138.

It is to be understood that while the above described pilot valve comprises a preferred construction, the principles of the invention ar not limited to that specific valve and other specific typs of electrically operated pilot valves are within the scope of the invention.

As will be explained, the armature assembly of the transducer is electromagnetically urged in a direction to close valves 281, 287 and is urged in the opposite direction by fluid pressure acting upon the bottom surface of the head 282 of valve element 274. When this fluid pressure overcomes a predetermined electromagnetic force of the transducer, the valve will be opened to a position whereat the fluid forces acting upon element 274 exactly counterbalance the counteracting electromagnetic force. Should the fluid forces acting upon valve element 274 vary in even the slightest degree, then the opening through the valve 281, 287 will be varied to maintain a desired pressure drop between inlet port 288 and outlet bore 280.

The force exerted by an electromagnet on an armature spaced from it is inversely proportional to the square of the distance between the armature and the poles of the magnet for a constant magnetomotive force. For this reason the coil 114 and core 129 of the transducer are preferably made large in order that there may be a wide air gap between the armature disk 130 and the poles 131 and 132, whereby in that range (0–.002 inch) in which the armature moves, the force acting upon the armature will remain substantially constant for any given magnetomotive force produced by the coil 114, and the transducer will deliver a substantially constant force within its predetermined stroke range in response to that magnetomotive force.

Coil 114 will tend to heat up under typical conditions of operation, which normally is accompanied by an increase in its resistance. Since this increase in coil resistance would diminish coil current and thereby cause the electromagnetic flux of the coil to decrease, thermistor 115 is preferably included in series with coil 114 by connection with coil lead 142. A resistor $R_T$ is connected in parallel with thermistor 115 between leads 142 and 144. The combination of coil 114, thermistor 115, and resistor $R_T$ presents a combined resistance between coil leads 143 and 144 which varies only a minimal amount with temperature, so that the overall resistance through which the pilot valve current passes is substantially constant. The combination of resistance elements will thus be understood to be equivalent to a temperature constant resistance.

The Electrical Control Circuit 14

FIGURE 1 shows a preferred electrical circuit 14 whereby the pilot valve 225 may be accurately controlled to maintain any flow within a desired operating range. It is to be understood that while the circuit shown forms the preferred means for energizing the pilot valve, the valve may be used with any other suitable source of electrical power.

The circuit 14 is designed to operate on conventional 110 volt, 60 cycle alternating current, is relatively simple and compact, and enables the operation of the pilot valve to be easily, accurately, and remotely controlled over its entire operating range. The circuit includes a power supply which is shown at the lower left portion of the figure. This power supply provides a regulated or constant direct current output at points 145 and 146. Power supply leads 147 and 148 are connectable to a conventional source of alternating current not shown.

A resistor $R_L$ is connected between lead 147 and a junction 150. A diode $D_1$, permitting current to flow to the right, is connected between junction 150 and a second junction 151, while reversely oriented diode $D_2$, permitting current flow to the left but not the right, is connected from junction 150 to a junction 152. Condenser $C_1$ is connected from junction 151 to lead 148, and condenser $C_2$ is connected in series wiht condenser $C_1$, from lead 148 to junction 152. Resistor $R_1$ is connected from junction 151 to the plate connection 153 of a voltage regulator tube VR. Junction 152 is connected by a lead 154 to the cathode connection 155 of tube VR.

In operation, condensers $C_1$ and $C_2$ are charged through diode $D_1$ and $D_2$ on opposite half-cycles of the input current, so that a relatively high, fluctuating potential tends to be established between junctions 151 and 152. The voltage regulator tube VR regulates this potential so that a lower, substantially constant potential is supplied at points 145 and 146, the former being positive with respect to the latter.

Referring now to the preferred control circuit itself, which appears to the right of the power supply, leads 158 and 159 are connectable to a conventional source of alternating current, as by respective connection to leads 147 and 148. Lead 158 is connected to a variable resistor $R_2$ which has an adjustable tap 160. Tap 160 is connected to one end of the primary winding of a transformer T, the other end of the primary being connected to lead 159.

A variable resistor $R_3$ having an adjustable tap 161 is connected at one end to the power supply at 145, tap 161 being connected to a junction 162. A variable resistor $R_4$ having a tap 163 is connected to the power supply at 146 through a lead 164. Tap 163 of resistor $R_4$ is connected to junction 162, and a condenser $C_4$ is connected between junction 162 and lead 164. The secondary winding of the transformer T is connected at one end to lead 164 and at the other end to lead 144. The respective taps 160, 161 and 163 of resistors $R_2$, and $R_3$, and $R_4$ are ganged as shown for simultaneous movement.

Junction 162 is connected through a diode $D_3$, which permits current flow to the right but not to the left, to a lead 165. Between lead 165 and coil lead 143 there are connected in parallel a number of variable resistors $R_a$, $R_b$, $R_c$, $R_d$, and $R_e$, each resistor having a switch $SW_a$, $SW_b$, $SW_c$, $SW_d$, and $SW_e$, respectively connected in series with it between leads 143 and 165. The taps of these resistors are respectively designated 166, 167, 168, 169, and 170. These taps are preset so that by selectively closing any of switches $SW_a$–$SW_e$, current will flow from lead 165 to lead 143 through a resistor $R_a$–$R_e$ of predetermined resistance.

The operation of the pilot valve control circuit 14 may now be explained. When energized, direct current from the power supply flows from positive connection 145 through resistor $R_3$ to tap 161, through lead 165 to whichever switch $SW_a$–$SW_e$ has been closed, through the resistor connected in series with that switch to lead 143 and coil 114. From the coil, the current flows through parallel-connected thermistor 115 and resistor $R_T$ to lead 144, then through the secondary winding of transformer T and lead 164 to negative connection 146 of the power supply. The magnitude of this current may be varied by adjusting variable resistor $R_3$ and $R_4$.

The application of alternating potential to the primary leads of transformer T induces an alternating potential in the secondary winding of the transformer which is superimposed on the direct voltage applied to the coil 114. This alternating voltage is applied to the circuit through lead 164, condenser $C_4$ or tap 163 depending on the position of the tap along resistor $R_4$, diode $D_3$, leads 165 and 143, valve coil 114, through thermistor 115 and resistor $R_T$, and transformer secondary lead 144.

By reason of the superimposition of the alternating potential or voltage established by the transformer on the direct voltage established by the power supply, the current in coil 114 becomes a modulated or fluctuating direct current which causes the coil flux to fluctuate very rapidly about an average value and thereby minimizes or narrows the range of hysteretic variation of the core material. By adding an alternating potential or voltage component to the direct voltage, the valve response variation due to hysteresis of the core 129 may be greatly reduced, to as little as plus or minus one half of one percent or less. The average direct voltage establishes the setting of the valve, while the alternating potential or voltage is effective to minimize the deviation about that setting which is due to the hysteresis of the core material of the transducer. Because it is desirable, in connection with the particular pilot valve 225 shown for purposes of illustration, to use a relatively large alternating potential or voltage with a low direct current component of total current and to use a relatively smaller alternating potential or voltage with a higher direct current component, the resistors $R_2$, $R_3$ and $R_4$ are ganged as shown so that the modulating voltage will be automatically reduced as the direct voltage is increased. Thus, as the taps are moved downwardly on the resistors the direct current is reduced while the alternating component is increased. While this ganging arrangement is preferred, independently adjustable variable resistors might be used or a single resistor might be substituted in place of the two separate resistors $R_3$ and $R_4$.

From the foregoing, it can be seen that the control circuit 14 is effective to supply a current to the valve coil 114 such that the magnitude of the flux established by the coil accurately determines the downward electromagnetic force exerted on the armature or disk 130. This force, in turn, determines the pressure drop across valve 281, 287.

Operation of the System

The pressure compensator mechanism 227 maintains a constant differential between the pressures in bores 233 and 234 and thus insures that the flow from groove 236 to groove 241 and load port 222 will be constant for any given axial position of the sharp lower edge 245 of land 243 with respect to groove 236. The axial position of spool 237 is dependent upon the relative pressures applied to the control surfaces at its opposite ends which, in turn, are determined by the pilot flow regulator mechanism 229 and pilot valve 225.

When a current is applied by circuit 14 to the coil 114 of pilot valve 225, the small volume pilot flow from regulator 229 flows through valve 281, 287 and establishes a pressure drop across it. The magnitude of this pressure drop is equal to the downward force of the transducer divided by the bottom area of valve element 282 on which the pressure of the inlet fluid to the pilot valve acts since the chamber above valve element 282 is connected through conduits 293, 294, 223, and 280 to the downstream or low pressure side of valve 281, 287. It will be apparent from what has been said that the magnitude of this pressure drop can be varied by adjusting the current supplied to coil 114.

This pressure differential is reflected in the control chambers at the upper and lower ends of spool 237. More specifically, the pressure in the chamber below the lower end of spool 237 will be higher by the amount of that pressure drop than the pressure in the chamber above the upper end of spool 237, because those chambers communicate respectively with inlet bore 288 through passageways 295 and 296, and outlet bore 280 through passageway 253.

The balance between the upwardly acting fluid force on the lower control surface of spool 237 and the downwardly acting fluid force and the force of spring 246 applied to its upper control surface control the position of spool 237 in bore 235 to determine the area of the orifice formed by elements 236, 245. By these pressure differential means the current applied to coil 114 determines the flow through the main flow metering assembly 221. To this main flow is added the pilot flow through conduit 280, their sum being constant for a given coil current.

The settings of the resistors $R_a$–$R_e$ determine the maximum current that can flow in valve coil 114 upon closure of the corresponding switches $SW_a$–$SW_e$, and thus in effect determine the various ranges of flows obtainable from the system. For example, with switch $SW_a$ closed, a relatively large maximum current can flow to coil 114. Since maximum valve current corresponds to maximum flow in conduit 223, closure of switch $SW_a$ will permit the highest maximum flow, and the widest flow range. The particular flow actually permitted by the pilot valve in that range depends upon the setting of the ganged resistors $R_2$, $R_3$, and $R_4$. By setting these resistors to present maximum resistance to the D.C. component of current, substantially zero flow will be permitted; by changing the resistances $R_2$–$R_4$ so that smaller resistances to the D.C. component of current are presented, larger flows up to the maximum permitted by resistor $R_a$ are obtained. Alternatively, by closing one of the other switches $SW_b$ to $SW_e$, successively smaller maximum currents to the pilot valve 225 are permitted so that successively smaller flow ranges are established.

When no current is applied to coil 114, there is no pressure drop across valve 281, 287 and the fluid forces acting on the control surfaces of spool 237 are equal. The force of spring 240 moves the spool downwardly, closing valve 236, 245 so that no flow to port 222 is permitted.

While I have described a preferred embodiment of my invention it will be understood that the invention is not limited to the use of the precise main flow control 221 illustrated, nor the pilot valve 225 precisely as illustrated, nor the circuit 14 as illustrated, and that the invention includes the use of other regulators, orifice means, transducer operated valves and/or circuitry within the scope of the claims which follow.

What is claimed is:

1. Flow control apparatus comprising the combination of, (a) orifice means, said means comprising a body having an inlet, an outlet, and structure forming an orifice between said inlet and outlet the area of which can be varied, said structure including a movable member, a separate pressure chamber associated with each of two oppositely facing equal areas of said movable member, said member being movable in response to unequal pressures on said areas in said chambers to vary the area of said orifice; (b) pressure regulator means for maintaining a constant differential between the pressures of fluid at the inlet and at the outlet of said orifice means, whereby for a given area of said orifice the flow of fluid through said orifice to said outlet is maintained constant; (c) a pilot valve including an inlet, an outlet, and a movable valve member cooperable with a port and an electric transducer for actuating said valve member in accordance with an electric signal applied thereto; and (d) passage means including a flow restrictor interconnecting the inlet of said pilot valve with the inlet of said orifice means, passage means interconnecting the inlet of said pilot valve with one of said chambers, and passage means interconnecting the outlet of said pilot valve with the outlet of said orifice means and the other of said chambers.

2. Flow control apparatus comprising the combination of adjustable orifice means, said means comprising a body having an inlet, an outlet, and a pressure differential operated movable valve element forming an orifice with said body between said inlet and outlet the area of which can be adjusted, two opposite surfaces of said element being exposed to pressure in two separate pressure chambers, spring means urging said valve element in a direction tending to close said orifice; pressure regulator means for maintaining a constant differential between the pressures of fluid at the inlet and at the outlet of said adjustable orifice means; a pilot valve, said pilot valve comprising a body having an inlet port and an outlet port, a movable valve member for establishing a pressure drop between said inlet port and said outlet port, and means for adjusting the pressure drop established by said valve member; a fluid passageway communicating between the inlet of said adjustable orifice means and the inlet port of said pilot valve; and passages applying the pressure drop established by said pilot valve directly to said pressure chambers, the outlet port of said pilot valve being connected to the outlet of said orifice means.

3. Flow control apparatus comprising, (a) variable orifice means, said variable orifice means including, a body having an inlet port and an outlet port, and a movable member forming a variable orifice with said body between said inlet port and said outlet port, said member presenting opposed control surfaces of equal area to control chambers and being movable in response to a difference in fluid pressures exerted in said control chambers on said control surfaces to vary the area of said orifice, (b) pressure compensator means for maintaining a pressure differential between fluid pressures at said inlet and outlet ports which is substantially constant for any given position of said member with respect to said body, and (c) electrically controllable means for establishing a pressure differential between the pressures of fluid in said control ports, said electrically controllable means having an inlet connected to one of said control chambers and an outlet connected to the other of said control chambers and to the outlet of said orifice means.

4. Flow control apparatus comprising, (a) variable orifice means, said variable orifice means including, a body having an inlet port and an outlet port, a movable member forming a variable orifice with said body between said inlet port and said outlet port, means defining at least two control chambers, said member presenting opposed control surfaces to said control chambers and being movable in response to a difference in fluid pressures exerted in said control chambers on said control surfaces to vary the area of said orifice, and means constantly urging said member in a direction tending to change the area of said orifice, (b) pressure compensator means for maintaining a pressure differential between fluid pressures at said inlet and outlet ports which is substantially constant for any given position of said member with respect to said body, (c) an electrically controllable pilot valve for establishing a pressure differential between the pressures of fluid in said control chambers, said pilot valve including, an inlet and an outlet, a movable valve element cooperable with a control port for establishing a pressure drop between said control port and said outlet, an electromechanical transducer for actuating said valve element relative to said control port to adjust the magnitude of said pressure drop in accordance with a current applied to said transducer, a fluid passageway for reflecting the pressure at said control port in one of said control chambers and a fluid passageway for reflecting the pressure at said outlet in the other of said control chambers and at the outlet port of said variable orifice means.

5. Flow control apparatus comprising, (a) variable orifice means, said variable orifice means including, a body having an inlet port and an outlet port, and a movable member forming a variable orifice with said body between said inlet port and said outlet port, said member presenting opposed control surfaces of equal area to control chambers and being movable in response to a difference in fluid pressures exerted in said control chambers on said control surfaces to vary the area of said orifice, (b) pressure compensator means for maintaining a pressure differential between fluid pressures at said inlet and outlet ports which is substantially constant for any given position of said member with respect to said body, (c) a pilot valve having an inlet and an outlet, a movable valve element cooperable with a control port for establishing a pressure drop between said control port and said outlet, an electromechanical transducer for actuating said valve element relative to said control port to adjust the magnitude of said pressure drop in accordance with a current applied to said transducer, and (d) fluid passageways comprising, restricted orifice means communicating with the inlet of said pilot valve, a passageway communicating between the inlet port of said variable orifice means and said restricted orifice means, a passageway extending from said control port to one of said control chambers, and a passageway communicating from the outlet of said pilot valve to the other of said control chambers and to the outlet port of said variable orifice means.

6. Flow control apparatus comprising, (a) variable orifice means, said variable orifice means including, a body having an inlet port and an outlet port, and a movable member forming a variable orifice with said body between said inlet port and said outlet port, means defining first and second control chambers, said member presenting opposed control surfaces of equal area to said control chambers and being movable in response to a differential in fluid pressures exerted in said control chambers on said control surfaces to vary the area of said orifice, (b) pressure compensator means for maintaining a substantially constant pressure differential between fluid pressures at said inlet port and at said outlet port, (c) a pilot valve having an inlet and an outlet, a movable valve element cooperable with a control port for establishing a pressure drop, an electromechanical transducer for actuating said valve element relative to said control port to adjust the magnitude of said pressure drop in accordance with a current applied to said transducer, (d) pilot flow control means for maintaining a constant flow of small volume to said pilot valve, said pilot flow control means being connected between the inlet of said pilot valve and the inlet port of said variable orifice means, and (e) a passageway communicating between the outlet of said pilot valve, the outlet port of said variable orifice means and one of said control chambers, and a passageway communicating between the inlet of said pilot valve and the other of said control chambers.

7. Flow control apparatus comprising, (a) variable orifice means, said variable orifice means including, a body having an inlet port and an outlet port, a movable member forming a variable orifice with said body between said inlet port and said outlet port, means defining first and second control chambers, said member presenting opposed control surfaces of equal area to said control chambers and being movable in response to a differential in fluid pressures exerted in said control chambers on said control surfaces to vary the area of said orifice, (b) pressure compensator means for maintaining a constant pressure differential between fluid pressures at the inlet and outlet ports of said variable orifice means, said pressure compensator means including, a body having an inlet port and an outlet port, a movable member forming a valve with said body between said inlet port and said outlet port, means defining first and second control chambers, said member presenting opposed control surfaces of equal area to said control chambers and being movable with respect to said body in response to a differential in fluid pressures in said control chambers, fluid in said first control chamber being at the pressure of fluid at said outlet port and exerting a force tending to close said valve in opposition to the pressure of fluid in said second control chamber, a fluid passageway communicating between said second control chamber, the outlet port of said variable orifice means and the first control chamber of said variable orifice means, and a fluid passageway communicating between said first control chamber and the inlet port of said variable orifice means, and (c) electrically controllable means for establishing a pressure differential between the pressures of fluid in the second and first control chambers of said variable orifice means, said means including, an inlet and an outlet, a movable valve element cooperable with a control port for establishing a pressure drop between said control port and said outlet, an electromechanical transducer for actuating said valve element relative to said control port to adjust the magnitude of said pressure drop in accordance with a current applied to said transducer, a fluid passageway for reflecting the pressure at said outlet in the first control chamber of said variable orifice means, a fluid passageway for reflecting the pressure at said inlet in the second control chamber of said variable orifice means, and pilot flow control means maintaining a constant pilot flow of small volume through said electrically controllable means.

8. Flow control apparatus comprising, (a) variable orifice means, said variable orifice means including, a body having an inlet port and an outlet port, a movable member forming a variable orifice with said body between said inlet port and said outlet port, means defining first and second control chambers, said member presenting opposed control surfaces of equal area to said control chambers and being movable in response to a differential in fluid pressures exerted in said control chambers on said control surfaces to vary the area of said orifice, and means urging said member in a direction tending to reduce the area of said orifice, (b) pressure compensator means for maintaining a constant pressure differential between fluid pressures at the inlet and outlet ports of said variable orifice means, said pressure compensator means including, a body having an inlet port and an outlet port, a movable member forming a valve with said body between said inlet port and said outlet port, means defining first and second control chambers, said member presenting opposed control surfaces of equal area to said control chambers and being movable with respect to said body in response to a differential in fluid pressures in said control chambers, means urging said member in a direction tending to open said valve, fluid in said first control chamber being at the pressure of fluid at said outlet port and tending to move said member in a direction closing said valve against the pressure of fluid in said second control chamber, said outlet port communicating with the inlet port of said variable orifice means, said second control chamber communicating with the outlet port of said variable orifice means and with first control chamber of said variable orifice means, (c) an electrically controlled pilot valve for establishing a differential between the pressures of fluid in the second and first control chambers of said variable orifice means, said pilot valve having an inlet connected to the second control chamber of said variable orifice means and an outlet connected to the first control chamber of said variable orifice means and (d) pilot flow control means maintaining a constant flow of small volume through said pilot valve.

9. Flow control apparatus comprising, (a) variable orifice means, said variable orifice means including, a body having an inlet port and an outlet port, a movable member forming a variable orifice with said body between said inlet port and said outlet port, means defining first and second control chambers, said member presenting opposed control surfaces of equal area to said control chambers and being movable in response to a differential in fluid pressures exerted in said control chambers on said control surfaces to vary the area of said orifice, and means urging said member toward said second control chamber and tending to reduce the area of said orifice, (b) pressure compensator means for maintaining a constant pressure differential between fluid pressures at the inlet and outlet ports of said variable orifice means, said pressure compensator means including, a body having an inlet port and an outlet port, a movable member forming a valve with said body between said inlet port and said outlet port, means defining first and second control chambers, said member presenting opposed control surfaces of equal area to said control chambers and being movable with respect to said body in response to a differential in fluid pressure in said control chambers, means urging said member in a direction tending to open said valve, fluid in said first control chamber being at the pressure of fluid at said outlet port and tending to move said member in a direction closing said valve against the pressure of fluid in said second control chamber, said outlet port communicating with the inlet port of said variable orifice means, said second control chamber communicating with the outlet port of said variable orifice means and with first control chamber of said variable orifice means, (c) a pilot valve having an inlet and an outlet, a movable valve element cooperable with a control port for establishing a pressure drop, an electromechanical transducer for actuating said valve element relative to said control port to adjust the magnitude of said pressure drop in accordance with a current applied to said transducer, (d) pilot flow control means for maintaining a constant flow of small volume to said pilot valve, said pilot flow control means being connected between the inlet of said pilot valve and the inlet port of said variable orifice means, and (e) passageway means communicating between the outlet of said pilot valve, the outlet port and the first control chamber of said variable orifice means, and passageway means communicating between the inlet of said pilot valve and the second control chamber of said variable orifice means.

10. Flow control apparatus comprising, (a) variable orifice means, said variable orifice means including, a body having an inlet port and an outlet port, a movable member forming a variable orifice with said body between said inlet port and said outlet port, means defining first and second control chambers, said member presenting opposed control surfaces of equal area to said control chambers and being movable in response to a differential in fluid pressures exerted in said control chambers on said control surfaces to vary the area of said orifice, and spring means urging said member in a direction tending to reduce the area of said orifice, (b) pressure compensator means for maintaining a substantially constant pressure differential between fluid pressures at said inlet port and at said outlet port, (c) a pilot valve having an inlet and an outlet, a movable valve element cooperable with a control port between said inlet and outlet for establishing a pressure drop, an electromechanical transducer for actuating said valve element relative to said control port to adjust the magnitude of said pressure drop in accordance with a current applied to said transducer, (d) pilot flow control means for maintaining a constant flow of small volume to said pilot valve, said pilot flow control means having an inlet and an outlet, the inlet of said pilot flow control means being connected to the inlet of said variable orifice means, the outlet of said pilot flow control means being connected to the inlet port of said pilot valve, and (e) a passageway communicating between the outlet of said pilot valve, the outlet port of said variable orifice means and one of said control chambers, and a passageway communicating between the inlet of said pilot valve and the other of said control chambers.

11. Flow control apparatus comprising, (a) variable orifice means, said variable orifice means including, a body having an inlet port and an outlet port, a movable member forming a variable orifice with said body between said inlet port and said outlet port, means defining first and second control chambers, said member presenting opposed control surfaces of equal area to said control chambers and being movable in response to a differential in fluid pressures exerted in said control chambers on said control surfaces to vary the area of said orifice, and spring means urging said member toward said second control chamber and tending to reduce the area of said orifice, (b) pressure compensator means for maintaining a constant pressure differential between fluid pressures at the inlet and outlet ports of said variable orifice means, said pressure compensator means including, a body having an inlet port and an outlet port, a movable member forming a valve with said body between said inlet port and said outlet port, means defining first and second control chambers, said member presenting opposed control surfaces of equal area to said control chambers and being movable with respect to said body in response to a differential in fluid pressures in said control chambers, means equalizing pressure in said first control chamber with pressure at said outlet port, fluid in said first control chamber exerting a force tending to close said valve in opposition to the pressure of fluid in said second control chamber, a fluid passageway communicating between said second control chamber, the outlet port of said variable orifice means and the first control chamber of said variable orifice means, and a fluid passageway communicating between said outlet port and the inlet port of said variable orifice means, and (c) electrically controllable means for establishing a pressure differential between the pressures of fluid in the second and first control chambers of said variable orifice means, said means including, an inlet and an outlet, a movable valve element cooperable with a control port for establishing a pressure drop between said control port and said outlet, an electromechanical transducer for actuating said valve element relative to said control port to adjust the magnitude of said pressure drop in accordance with a current applied to said transducer, a fluid passageway for reflecting the pressure at said outlet in the first control chamber of said variable orifice means, a fluid passageway for reflecting the pressure at said inlet in the second control chamber of said variable orifice means, and pilot flow control means maintaining a constant pilot flow of small volume through said electrically controllable means.

12. Flow control apparatus comprising, (a) variable orifice means, said variable orifice means including, a body having an inlet port and an outlet port, and a movable member forming a variable orifice with said body between said inlet port and said outlet port, means defining first and second control chambers, said member presenting opposed control surfaces of equal area to said control chambers and being movable in response to a differential in fluid pressures exerted in said control chambers on said control surfaces to vary the area of said orifice, and spring means tending to close said orifice, (b) pressure compensator means for maintaining a substantially constant pressure differential between fluid pressures at said inlet port and at said outlet port, and (c) electrically controllable means for establishing a pressure differential between the pressures of fluid in the first and second control chambers of said variable orifice means, said means including, an inlet and an outlet, a movable valve element cooperable with a control port for establishing a pressure drop between said control port and said outlet, an electromechanical transducer for actuating said valve element relative to said control port to adjust the magnitude of said pressure drop in accordance with a current applied to said transducer, pilot flow control means connected to said electrically controllable means for maintaining a constant pilot flow of small volume through said electrically controllable means, and fluid passageways applying the pressure drop established by said electrically controllable means between said first and second control chambers of said variable orifice means.

13. Flow control apparatus comprising, (a) variable orifice means, said variable orifice means including, a body having an inlet port and an outlet port, and a movable member forming a variable orifice with said body between said inlet port and said outlet port, means defining first and second control chambers, said member presenting opposed control surfaces of equal area to said control chambers and being movable in response to a differential in fluid pressures exerted in said control chambers on said control surfaces to vary the area of said orifice, and spring means tending to close said orifice, (b) pressure compensator means for maintaining a substantially constant pressure differential between fluid pressures at said inlet port and at said outlet port, and (c) electrically controllable means for establishing a pressure differential between the pressures of fluid in the first and second control chambers of said variable orifice means, said means including, an inlet and an outlet, a movable valve element cooperable with a control port for establishing a pressure drop between said control port and said outlet, an electromechanical transducer for actuating said valve element relative to said control port to adjust the magnitude of said pressure drop in accordance with a current applied to said transducer, pilot flow control means connected to said electrically controllable means for maintaining a constant pilot flow of small volume through said electrically controllable means, and fluid passageways applying the pressure drop established by said electrically controllable means between said first and second control chambers of said variable orifice means, and passage means equallizing the pressure of fluid having passed through said electrically controllable means and said pilot flow control means with that of fluid at the outlet of said variable orifice means.

14. Flow control apparatus comprising, (a) variable orifice means, said variable orifice means including, a body having an inlet port and an outlet port, a movable member forming a variable orifice with said body between said inlet port and said outlet port, means defining first and second control chambers, said member presenting opposed control surfaces of equal area to said control chambers and being movable in response to a differential in fluid pressures exerted in said control chambers on said control surfaces to vary the area of said orifice, (b) pressure compensator means for maintaining a substantially constant pressure differential between fluid pressures at said inlet port and at said outlet port, (c) a pilot valve comprising a body having a bore, a control port axially entering said bore, a piston slidable in said bore, said piston having a tapered extension on one face thereof forming a valve with said control port, an inlet entering said bore between said piston and control port, a shank of diameter equal to that of said control port extending from the surface of said piston remote from said control port, said shank being slidable in a cylinder, an electromechanical transducer operatively actuating said shank to urge said piston toward said control bore with a force varying in accordance with an electrical signal applied to said transducer, (d) pilot flow control means for applying a flow of constant volume to said pilot valve, said pilot flow control means being connected between the inlet of said pilot valve and the inlet port of said variable orifice means, and (e) passage means communicating between the control port of said pilot valve and one of said control chambers, and passage means acommunicating between the inlet of said pilot valve and the other of said control chambers.

15. Flow control apparatus comprising, (a) variable orifice means, said variable orifice means including, a body having an inlet port and an outlet port, a movable member forming a variable orifice with said body between said inlet port and said outlet port, means defining first and second control chambers, said member presenting opposed control surfaces of equal area to said control chambers and being movable in response to a differential in fluid pressures exerted in said control chambers on said control surfaces to vary the area of said orifice, (b) pressure compensator means for maintaining a substantially constant pressure differential between fluid pressures at said inlet port and at said outlet port, (c) a pilot valve comprising a body having a bore, a control port axially entering said bore, a piston slidable in said bore, said piston having a tapered extension on one face thereof forming a valve with said control port, an inlet entering said bore between said piston and control port, a shank of diameter equal to that of said control port extending from the surface of said piston remote from said control port, said shank being slidable in a cylinder, an electromechanical transducer operatively actuating said shank to urge said piston toward said control bore with a force varying in accordance with an electrical signal applied to said transducer, (d) pilot flow control means for applying a flow of constant volume to said pilot valve, said pilot flow control means being connected between the inlet of said pilot valve and the inlet port of said variable orifice means, and (e) passage means communicating between the control port of said pilot valve, the outlet port of said variable orifice means, the face of said piston remote from said extension, and one of said control chambers, and passage means communicating between the inlet of said pilot valve and the other of said control chambers.

16. Flow control apparatus comprising, (a) variable orifice means, said variable orifice means including, a body having a bore, an inlet port and an outlet port entering said bore laterally at axially spaced positions therein, a cylindrical spool slidable in said bore, said spool having a central groove flanked by two lands, said central groove constantly communicating with said outlet port, the edge of one of said lands adjacent said groove forming a variable orifice with said inlet port, said spool being movable in response to a differential in fluid pressures exerted on its opposite ends to vary the area of said orifice, (b) pressure compensator means for maintaining a substantially constant pressure differential between fluid pressures at said inlet port and at said outlet port, (c) a pilot valve having an inlet and an outlet, a movable valve element cooperable with a control port for establishing a pressure drop, an electromechanical transducer for actuating said valve element relative to said control port to adjust the magnitude of said pressure drop in accordance with a current applied to said transducer, (d) a flow restrictor between the inlet of said pilot valve and the inlet port of said variable orifice means, and (e) passage means communicating between the outlet of said pilot valve, the outlet port of said variable orifice means and one end of said spool, and passage means communicating between the inlet of said pilot valve and the other end of said spool.

17. An adjustable flow control comprising,
variable orifice means having an inlet and an outlet, said variable orifice means presenting an orifice through which flow must pass in flowing through said means from said inlet to said outlet, the area of said orifice varying with a differential in pressures acting on opposite control surfaces presented by said orifice means in pressure chambers, said orifice means including a spring tending to close said orifice,
pressure compensator means maintaining a constant pressure differential between the inlet and outlet of said orifice means,
an adjustable pilot valve and a flow restrictor connected in series flow relation between the inlet and outlet of said variable orifice means, said pilot valve establishing a pressure drop when fluid flows therethrough, and passage means applying said pressure drop between said chambers in opposition to said spring.

References Cited in the file of this patent
UNITED STATES PATENTS

| | | |
|---|---|---|
| 2,957,488 | Farkas | Oct. 25, 1960 |
| 2,986,161 | Renick | May 30, 1961 |
| 3,086,553 | Levine | Apr. 23, 1963 |